(12) United States Patent
Boudreaux

(10) Patent No.: US 10,050,865 B2
(45) Date of Patent: Aug. 14, 2018

(54) MAINTAINING ROUTING INFORMATION

(71) Applicant: John Boudreaux, Boca Raton, FL (US)

(72) Inventor: John Boudreaux, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 610 days.

(21) Appl. No.: 14/463,824

(22) Filed: Aug. 20, 2014

(65) Prior Publication Data

US 2016/0057048 A1 Feb. 25, 2016

Related U.S. Application Data

(60) Provisional application No. 61/973,962, filed on Apr. 2, 2014, provisional application No. 61/946,054, filed on Feb. 28, 2014.

(51) Int. Cl.
| | |
|---|---|
| *H04L 12/755* | (2013.01) |
| *H04L 12/741* | (2013.01) |
| *H04W 40/24* | (2009.01) |
| *H04W 84/18* | (2009.01) |
| *H04L 12/733* | (2013.01) |

(52) U.S. Cl.
CPC .......... *H04L 45/021* (2013.01); *H04W 40/24* (2013.01); *H04L 45/122* (2013.01); *H04W 40/248* (2013.01); *H04W 84/18* (2013.01)

(58) Field of Classification Search
CPC .... H04L 45/021; H04L 45/122; H04W 40/24; H04W 40/248; H04W 84/18
See application file for complete search history.

(56) References Cited

U.S. PATENT DOCUMENTS

| | | |
|---|---|---|
| 5,414,812 A | 5/1995 | Filip et al. |
| 6,272,621 B1 | 8/2001 | Key et al. |
| 6,804,790 B2 | 10/2004 | Rhee et al. |
| 7,313,399 B2 | 12/2007 | Rhee et al. |
| 7,688,808 B2 | 3/2010 | Ren et al. |
| 7,966,660 B2 | 6/2011 | Yermal et al. |
| 8,335,164 B2 | 12/2012 | Liu |
| 8,400,268 B1 | 3/2013 | Malik et al. |
| 8,488,589 B2 | 7/2013 | Rudnick et al. |
| 8,537,714 B2 | 9/2013 | Liu |

(Continued)

FOREIGN PATENT DOCUMENTS

| | | |
|---|---|---|
| WO | WO 01/06401 | 1/2001 |
| WO | WO2013/159217 | 10/2013 |

OTHER PUBLICATIONS

International Search Report and Written Opinion, PCT/US15/17477.

(Continued)

*Primary Examiner* — Abdullahi E Salad
(74) *Attorney, Agent, or Firm* — Fish & Richardson P.C.

(57) ABSTRACT

An apparatus for use in a mesh network is described and includes memory storing instructions, one or more routing tables, and processing devices to execute the instructions to perform operations including receiving a routing packet including routing information and a route count value. Incrementing the route count value to produce an incremented count and transmitting the routing packet over the mesh network if the incremented count does not exceed a maximum count corresponding to a maximum number of hops for the routing packet.

14 Claims, 4 Drawing Sheets

(56) References Cited

U.S. PATENT DOCUMENTS

| | | |
|---|---|---|
| 2003/0043763 A1* | 3/2003 | Grayson .............. H04L 1/1867 370/329 |
| 2003/0099221 A1 | 5/2003 | Rhee |
| 2004/0027243 A1 | 2/2004 | Carrender |
| 2004/0090329 A1 | 5/2004 | Hitt |
| 2005/0052281 A1 | 3/2005 | Bann |
| 2006/0039356 A1 | 2/2006 | Rao et al. |
| 2006/0285579 A1 | 12/2006 | Rhee et al. |
| 2007/0239350 A1 | 10/2007 | Zumsteg et al. |
| 2007/0248065 A1 | 10/2007 | Banerjea et al. |
| 2008/0002599 A1 | 1/2008 | Yau et al. |
| 2008/0068267 A1 | 3/2008 | Huseth |
| 2008/0144587 A1 | 6/2008 | Gupta et al. |
| 2009/0285213 A1* | 11/2009 | Chen .................... H04W 40/28 370/392 |
| 2011/0051656 A1 | 3/2011 | Hethuin et al. |
| 2011/0310791 A1 | 12/2011 | Prakash et al. |
| 2012/0039235 A1 | 2/2012 | Chen et al. |
| 2013/0003645 A1 | 1/2013 | Shapira et al. |
| 2013/0064233 A1 | 3/2013 | Hethuin et al. |
| 2013/0163466 A1 | 6/2013 | Hughes et al. |
| 2013/0239192 A1 | 9/2013 | Linga et al. |
| 2013/0279409 A1 | 10/2013 | Dublin, III et al. |
| 2013/0336230 A1 | 12/2013 | Zou et al. |
| 2014/0112126 A1 | 4/2014 | Claessens et al. |
| 2016/0057048 A1* | 2/2016 | Boudreaux ........... H04L 45/021 709/223 |

OTHER PUBLICATIONS

International Search Report and Written Opinion, PCT/US15/17702.
International Search Report and Written Opinion, PCT/US15/17680.
DePoorter et al.., "Enabling Direct Connectivity Between Heterogeneous Objects In The Internet Of Things Through A Network Service Oriented Architecture,", Aug. 31, 2011, retrieved from the Internet "http://jwcn.eurasigjournals.com/content/pdf/1687-1499-2011-61.pdf".
EP Supplementary European Search Report App. No. EP 15 75 6099.
EP Supplementary European Search Report App. No. EP 15 75 5714.
Ying Zhou et al., "Mobile Agent-based Policy Management for Wireless Sensor Networks,", Wireless Communications, Networking and Mobile Computing, 2005, Proceedings 2005 Int'l Conference on Wuhan, China, vol. 2, (Sep. 23, 2005), pp. 1207-1210.
European Search Report, PCT/US2015/017212.

* cited by examiner

MAINTAINING ROUTING INFORMATION

CLAIM OF PRIORITY

This application claims priority under 35 U.S.C. §119(e) to provisional U.S. Patent Application 61/973,962, filed on Apr. 2, 2014, entitled: "Wireless Sensor Network", and provisional U.S. Patent Application 61/946,054, filed on Feb. 28, 2014, entitled: "Wireless Sensor Network", the entire contents of which are hereby incorporated by reference.

BACKGROUND

This specification relates generally to maintaining routing information in a network, such as self-organizing network.

Wireless sensor network/wireless device based data collection systems having remote server-based monitoring and report generation are used in applications such as home safety monitoring, electrical and water utility meter monitoring, and human and asset tracking. For example, it is common for businesses and homeowners to have a security system for detecting alarm conditions at their premises and for signaling conditions to a monitoring station or to authorized users of the security system.

SUMMARY

According to an aspect, an apparatus for use in a mesh network includes memory storing instructions that are executable, and one or more routing tables; and one or more processing devices to execute the instructions to perform operations including receiving a routing packet comprising routing information and a route count value, storing, in a routing table; an entry comprising the routing information, incrementing the route count value to produce an incremented count, transmitting the routing packet over the mesh network if the incremented count does not exceed a maximum count corresponding to a maximum number of hops for the routing packet, and updating one or more entries in the routing table based on a number of times that the one or more entries were checked following receipt of one or more routing packets.

Any two or more of the features described in this specification, including this summary section, may be combined to form implementations not specifically described herein.

All or part of the foregoing may be implemented as a computer program product comprised of instructions that are stored on one or more non-transitory machine-readable storage media or devices, and which are executable on one or more processing devices. All or part of the foregoing may be implemented as an apparatus, method, or network system that may include one or more processing devices and memory to store executable instructions to implement functionality.

The details of one or more examples are set forth in the accompanying drawings and the description below. Further features, aspects, and advantages will become apparent from the description, the drawings, and the claims.

DETAILED DESCRIPTION

Described herein are examples of network features that may be used in various contexts including, but not limited to, security/intrusion and alarm systems. Example security systems may include an intrusion detection panel that is electrically or wirelessly connected to a variety of sensors. Those sensors types may include motion detectors, cameras, and proximity sensors (used, e.g., to determine whether a door or window has been opened). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Figure 1:
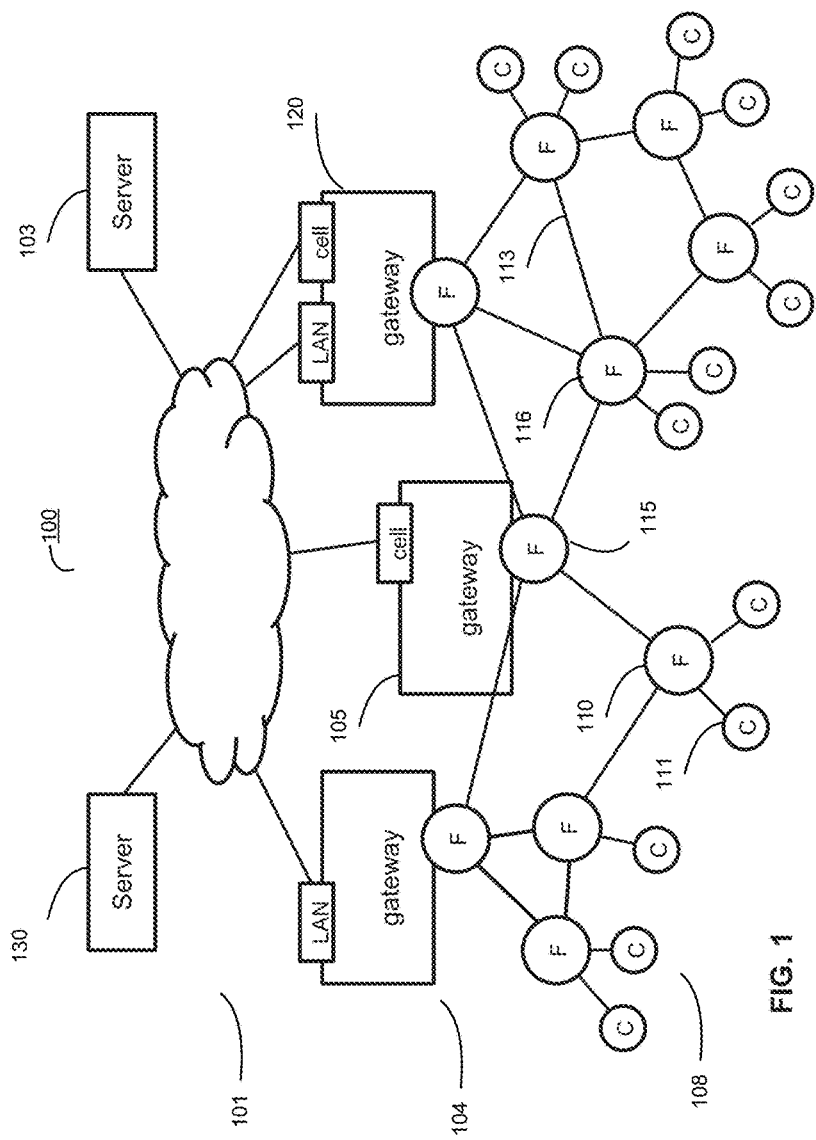
FIG. 1 is a schematic diagram of an example networked security system.

FIG. 1 shows an example (global) distributed network topology 100 for an example Wireless Sensor Network (WSN). In example network topology 100, upper tier 101 of the network may include traditional servers 103 and/or virtual servers running in a "cloud computing" environment and networked using appropriate networking technologies such as Internet connections. Applications running on those servers may communicate using XML/SOAP, RESTful web service, and/or other appropriate application layer technologies such as HTTP and ATOM.

In example network topology 100, middle tier 104 may include gateways 105 located at central, convenient places inside individual buildings and structures. Such gateways may communicate with the upper tier servers and cloud applications using web programming techniques or other appropriate technologies. These gateways 105 communicate with servers 103 in the upper tier whether the servers are stand-alone dedicated servers and/or cloud based servers running cloud applications using web programming techniques. The middle tier gateways 105 are also shown with both local area network (e.g., Ethernet or 802.11) and cellular network interfaces.

In example network topology 100, lower tier (edge layer) 108 may include fully-functional sensor nodes 110 (wireless devices, marked in FIG. 1 with "F") and constrained wireless sensor nodes or sensor end-nodes 111 (marked in FIG. 1 with "C"). In some implementations, each gateway may be equipped with an access point (fully functional node or "F" node) physically attached thereto, which provides a wireless connection point to the other nodes in the wireless network.

Constrained computing devices as used herein are devices with substantially less persistent and volatile memory than other computing devices, examples of which include sensors in a detection system. Currently examples of constrained devices would be those with less than about a megabyte of flash/persistent memory, and less than 10-20 kilobytes (KB) of RAM/volatile memory. These constrained devices are configured in this manner; generally due to cost/physical configuration considerations.

In example network topology 100, the communication links (illustrated by lines 113) shown in FIG. 1 are direct (single-hop network layer) connections between devices. A formal networking layer (that may function in each of the three tiers shown in FIG. 1) can use a series of these links, together with appropriate routing technology, to send messages (fragmented or unfragmented) from one device to another, over a physical distance. In other network topologies, each link may represent two or more hops and/or the configuration may be different than shown in FIG. 1.

In some example implementations, the WSN state function-based application layer uses an edge device operating system (not shown, but such as disclosed in the above mentioned provisional application) that allows for loading and execution of individual functions (after the booting of the device) without rebooting the device (so-called "dynamic programming"). In other implementations, edge devices could use other operating systems provided such systems allow for loading and execution of individual functions (after the booting of the device preferably without rebooting of the edge devices.

Example distributed network topology 100 may include or be part of a self-organizing network, such as a wireless mesh network. In some implementations, all of distributed network topology 100 is implemented using wireless mesh technology. In some implementations, only part of distributed network topology 100 is implemented using wireless mesh technology. For example, in FIG. 1, in some implementations, upper tier 101 may be implemented using standard network technology, and middle tier 104 and lower tier 108 may be implemented as one or more wireless mesh networks. In some implementations, upper tier 101 and middle tier 104 may be implemented using standard network technology, and lower tier 108 may be implemented using one or more wireless mesh networks. For example, a different wireless mesh network may be associated with each gateway, or a single wireless mesh network may include all of the gateways shown in FIG. 1 (and others) as well as all or some functional and sensor nodes.

In some implementations, wireless mesh network is a self-organizing wireless network, in which the network devices themselves establish communication links with one another. The communication links may be established by maintaining and updating routing tables associated with each network device. In the example implementations described herein, a wireless mesh network may be established between sensor, functional and/or gateway devices that are part of a larger building, or enterprise-wide system. In examples, such devices may be used for monitor and/or control in a security/intrusion, fire alarm, or other appropriate system. The devices report status information from their systems to a central monitoring service, which may include one or more host computing devices. For example, the central monitoring service may include server 103 and/or server 130, in addition to other computing equipment. The central monitoring service may also send control commands, which the devices use for configuration and/or control.

Figure 2:
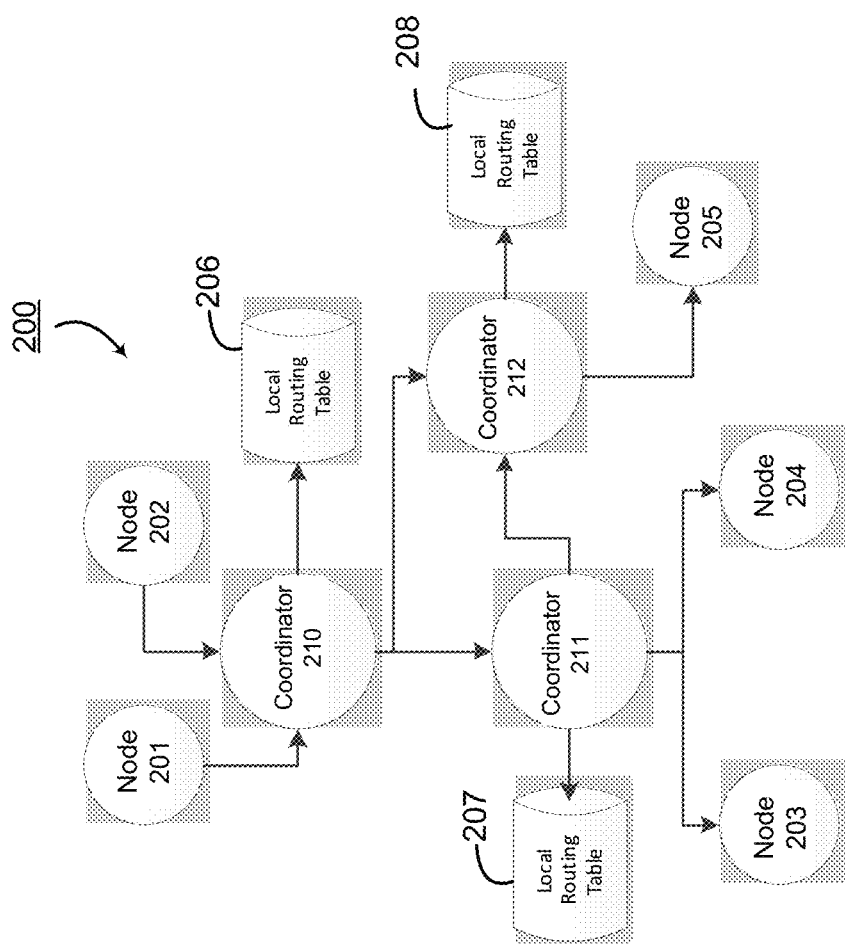
FIG. 2 is a block diagram of a portion of the networked security system of FIG. 1.

FIG. 2 shows components of an example wireless network 200 on which the processes described herein may be implemented. In the implementations described herein, wireless network 200 is a wireless mesh network, and may be part of the larger network shown in FIG. 1. However, in other implementations, the processes described herein may be performed using other types of networks.

Wireless network 200 may be a heterogeneous network, in which devices on wireless network 100 do not perform the same functions, or a homogeneous network, in which devices on wireless network 100 perform the same functions or substantially the same functions. Wireless network 100 includes nodes 201 to 205, which may, or may not, be endpoint devices on the network, such as sensors, monitors or the like. Typically, the primary connection between a node and the network is wireless; however, one or more of nodes 201 to 205 may also include a wired connection to network 200.

Wireless network 200 also includes coordinator devices 210 to 212, which may be intermediary devices on the network. In the example implementations described herein, a coordinator device, e.g., coordinator device 210, functions as a router or repeater to forward data packets sent by anode, e.g., node 201 or node 204 (which need not be a directly connected node) or by another coordinator device, e.g., coordinator 211, along a path through wireless network 200. The coordinators 210-212 communicate with each other to maintain and update routing information to enable communication between devices, and to account for changes in the network 200. The coordinator devices store routing information, such as a next hop along a network path to a data packet's intended destination, and a hop on a return path. This information is stored in one or more local routing table(s) (e.g., local routing table 206, 207, 208) in memory on, or otherwise accessible to, the corresponding coordinator device. In some implementations, the nodes may also include one or more such routing table(s), particularly if the nodes are, or may become part of, a network pathway. The processes described herein may be used to build, and update, those routing tables, along with routing tables on any other appropriate network devices.

Nodes 201 to 205 and coordinator devices 210 to 212 may communicate via radio frequency (RF) links using any appropriate wireless protocol or protocols. Wireless network 200 may also include other types of devices (not shown), such as computers, base stations, or embedded processing devices that interact with the devices of FIG. 2.

Nodes 201 to 205 may each be either a source or a destination of network data. In some implementations, the nodes constitute, or are to, one or more sensors or controlling devices. The sensors are part of physical systems, such as an alarm system or a security system, as noted above, and sense or monitor physical quantities, such as temperature, movement, or the like. Anode acquires analog and/or digital signals as a result of this sensing and transmit data packets corresponding to these signals to an appropriate device via wireless network 200. An antenna (not shown) is included on each endpoint device to enable transmission. Antennas are also included on the other wireless devices in the network.

Multiple mesh networks may occupy the same physical space. Data packets for such networks may be differentiated, e.g., by a network group identifier (ID). Thus, the networks remain logically separate even though they occupy the same physical space.

Wireless mesh networks are typically established by one or more prospective network devices initiating communication to one or more other prospective network devices. For example, a first prospective network device (such as node 202) may output a packet identifying the first device (node 202) and in an attempt to locate other devices within the RF vicinity of the first device (node 202), with which the first device may connect. A second prospective network device (such as coordinator device 210) in that vicinity may respond and identify itself as a device that is available for connection to the first device. The two devices may then establish a connection through appropriate back-and-forth communications. This general process, or other(s) like it, may be repeated either by both devices or by other devices until the mesh network is formed. Typically, at least one of the devices is initially in communication with a base station or other wired connection to the central monitoring service, enabling connection between the wireless mesh network and the central monitoring service. Upon connection to the wireless network, routing tables throughout the wireless network may be updated.

Devices may enter, e.g., become part of, a wireless mesh network in the manner described above, or in any other appropriate manner. Likewise, devices may also leave the wireless mesh network. For, example, devices may be deactivated or lose power, causing the devices to leave the network. In some cases, loss of a single device may affect communication to numerous other devices on the network. For example, a single device may be the primary pathway over which communications to numerous other devices pass. As a result, loss of that device also interrupts that primary path, necessitating re-routing of communications through the wireless mesh network. This re-routing can affect the contents of routing tables in nodes and coordinators.

The example processes described herein enable routing of data packets through a changing network environment resulting, e.g., from devices entering or leaving the network. This is done by updating configurable routing tables that are distributed across all or some routing nodes in the network. The processes may be used on wireless mesh networks of any size; however, they may have particular applicability to small-to medium-sized networks, in contrast to large wide area networks such as the Internet.

The implementation below is of wireless mesh network 200 updating routing tables based on packet transmissions through node 201 and coordinators 210, 211.

Figure 3:
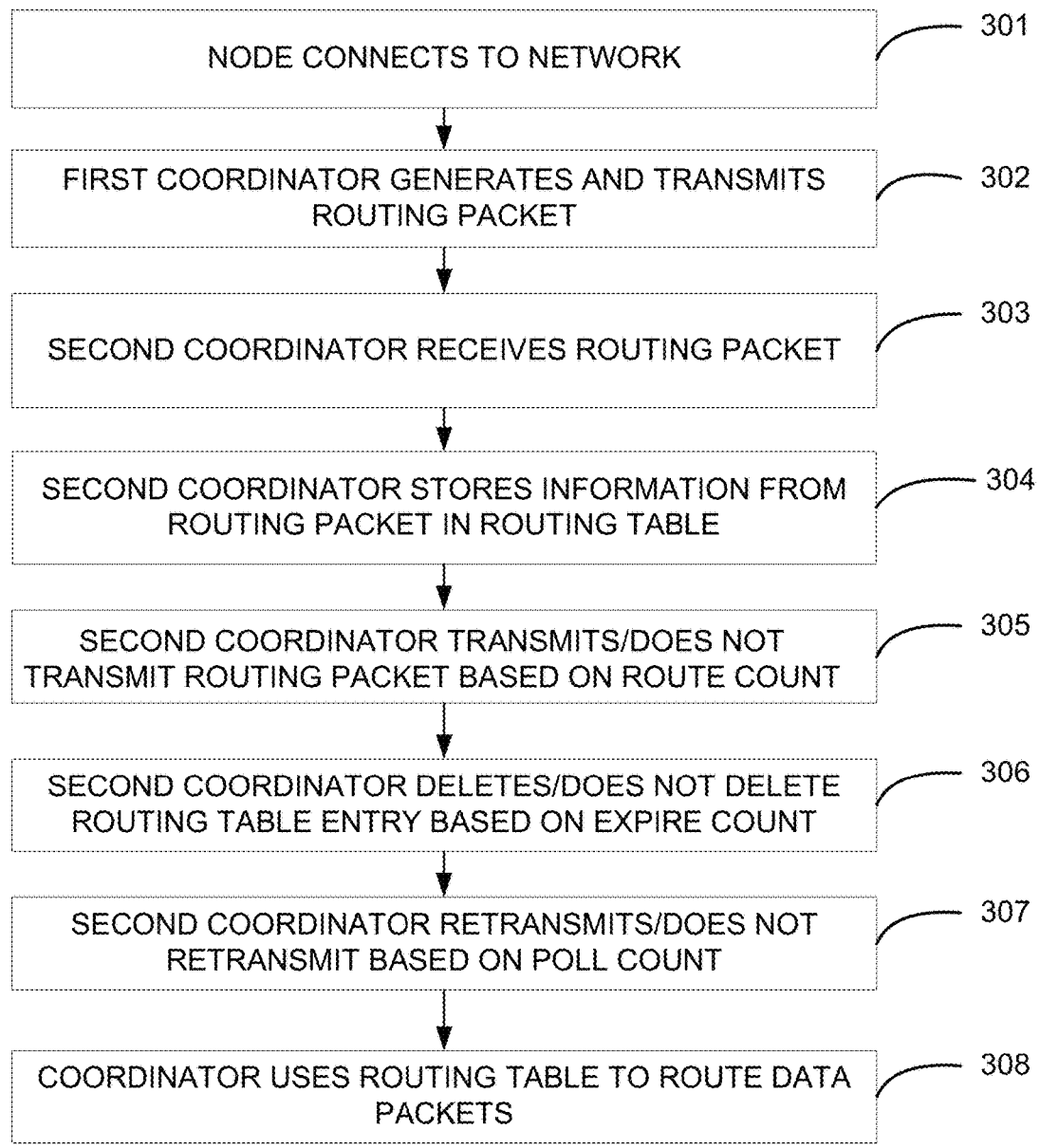
FIG. 3 is a flowchart showing an example process for maintaining routing tables in the network portion of FIG. 2.

Referring to the flowchart of FIG. 3, in this example implementation, a node (such as node 201) connects (301) to a network (such as network 200). Such connection may be implemented in any appropriate manner using one or more processes, through appropriate communication to coordinator 210. In response, a first coordinator (such as coordinator 210), to which the node has connected, generates and transmits (302) a routing packet containing, in its mesh header (the part of the packet reserved for routing information), the coordinator's short address, the node's short address, and an route count value of zero. In this example, the routing packet is transmitted to advise other devices (e.g., coordinators) in the RF vicinity of the first coordinator of the addition of the node to the network. Information in the routing packet is known to the first coordinator beforehand or is obtained through communication with the node. In this example implementation, a short address is a 2-byte/16-bit random, uniquely-assigned number that identifies a device (a node, a coordinator, or another network device) within the network. In other implementations, the short address may be replaced by any other appropriate node and/or coordinator identification information. The route count is a value that is incremented at each node (hop), and is used as described below.

A second coordinator, such as coordinator 211, receives (303) the routing packet from coordinator 210. Coordinator 211 checks its routing table entries to determine if information from the routing packet is already present in the routing table. If that information is not already present (which it should not be at this point), coordinator 211 records (e.g., stores) (304), in its routing table 207, a routing entry that includes coordinator 210's short address, node 201's short address, and the route count incremented by one (the route count at coordinator 210 being set at zero). This routing entry is usable by coordinator 211 to route data to/from node 201.

Routing table 207 also stores an "expire count" and a "poll count" for each routing entry in routing table 207. The expire count is a value corresponding to (e.g., equal to) the greatest number of times a route entry will be checked before being deleted from the routing table. The poll count is a value corresponding to (e.g., equal to) the greatest number of times a routing table entry will be checked by a device before routing information for that entry is retransmitted. The values for the expire count and the poll count are either propagated through the network by the coordinators or are hard-coded into the routing table of each device. Other arrangements are possible. Each entry of the routing table may include counters corresponding to the expire count and to the poll count. These counters are incremented by one each time the corresponding routing table entry is checked. The corresponding counter values are compared to the expire count and poll count, and the results of the comparisons are used as described below.

Coordinator 211 performs a check to determine whether the route count incremented by one exceeds a maximum count stored in routing table 207. In this example implementation, the maximum count is a number corresponding to (e.g., equal to) the greatest number of hops through which a packet will be routed.

If the route count does not meet or exceed the maximum count, coordinator 211 transmits (305) the routing packet to other coordinators (such as coordinator 212) that are within its RF vicinity. Otherwise, if the route count meets or exceeds the maximum count, the routing packet is not transmitted. In this regard, if the route count meets or exceeds the maximum count, the maximum number of hops has been reached at coordinator 211. Thus, no further transmission of the routing packet is permitted, which is why the routing packet is not transmitted to another device (e.g., coordinator) on the network. The route count for each routing table entry may be stored in the routing table.

As coordinator 211 checks entries of its routing table 207, the corresponding expire counter and poll counters for entries in routing table 207 are each incremented by one, as described above. If an expire count value reaches the stored expire count, then the corresponding entry in the routing table is deleted (306). As noted, the expire count is a value corresponding to (e.g., equal to) the greatest number of times a route entry will be checked before being deleted from the routing table. Generally, the expire count is used to adjust the network's configuration resulting, e.g., from movement of nodes into or out of the network. If the expire count is reached, the corresponding routing entry is deleted on the assumption that the entry may no longer be valid. Notably, a check is not performed to determine whether the entry is still valid. Rather, the entry is assumed not to be valid any longer, and is deleted. Thus, the system forces the network to reestablish routing pathways after a certain number of checks (look-ups), thereby reducing the number of potentially invalid routes in the routing table.

If the poll count value reaches the stored poll count and the route count for a corresponding routing table entry has a value of zero (e.g., the device is the coordinator to generate the routing packet and thus the first coordinator to transmit the routing packet), then routing information for that entry is re-transmitted (307). This allows for periodic updating of routing table entries from source devices throughout the network.

A coordinator uses the routing table built and maintained in the manner described above to route data packets during normal network operation. For example, when a coordinator (e.g., coordinator 211) receives a regular (e.g., non-routing) data packet having the coordinator's short address in the mesh header, the coordinator uses the destination's short address (also found in the mesh header) to check for, and to identify corresponding values in the routing table, if available. The values may be, e.g., the address of one or more devices on a network path to the data packet's destination. In this example, coordinator 211 performs the check, and obtains the values from its routing table 207. The coordinator then uses the values obtained from its routing tables to re-address the mesh header of the packet to forward the packet to its destination. If the count is zero in the table, then the coordinator fills in the destination address in the mesh header instead of a coordinator address before sending the packet.

The nodes and coordinators may be implemented using any appropriate type of computing device, such as a mainframe work station, a personal computer, a server, a portable computing device, or any other type of intelligent device capable of executing instructions, connecting to a network, and forwarding data packets through the network. The nodes and coordinators can execute any appropriate computer programs to generate, receive, and transmit data packets for use on the network.

Each of nodes 201 to 205 and coordinators 210 to 212 may include one or more non-transitory machine-readable media, such as computer memory (not shown), to store executable instructions. Each of these devices may also include one or more processing devices (e.g., microprocessors, programmable logic, application-specific integrated circuits, and so forth) for executing the instructions to perform all or part of the functions described herein. In some implementations, the structure of nodes 201 to 205 may be about the same as the structure of coordinators 210 to 212. This may not be the case in other implementations, e.g., their structures may be different. Each device, however, is programmable to implement appropriate functionality.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

An example, non-limiting application of the WSN of FIGS. 1 to 3 is in a security system for intrusion detection, fire, toxic gas, monitor, etc. installed at one or more premises such as one or more residential houses or building(s) and especially in, e.g., commercial, industrial, buildings, complexes, etc.

In some typical intrusion detection system implementations, an intrusion detection panel is included, whereas in others more sophisticated management systems are included. Sensors/detectors may be disbursed throughout the premises. The intrusion detection system may be in communication with a central monitoring station (also referred to as central monitoring cent via one or more data or communication networks (only one shown, such as the Internet; the phone system, or cellular communication system.

The intrusion detection panel may be configured to receive signals from plural detectors/sensors that send, to the intrusion detection panel, information about the status of the monitored premises. Several types of sensor/detectors (unless otherwise noted are used interchangeably herein) may be used. One type of detector is a detector that sends a binary signal that indicates presence or absence of an event. Examples of these types of detectors include glass break detectors and contact switches. Another type of detector is a detector sends metadata that includes data resulting from processing applied by the detector to inputs received by the sensor. Examples of these types of detectors may include microphones, motion detectors, smart switches and cameras, recognition devices and so forth.

Some of the detectors 'sensors may be hard wired but in general the detectors communicate with systems wirelessly over the WSN. In general detectors sense glass breakage, motion, gas leaks, fire, and/or breach of an entry point, and send the sensed information over the WSN, as needed and appropriate. Based on the information received from the detectors, the intrusion detection panel determines whether to trigger alarms, e.g., by triggering one or more sirens (not shown) at the premise and/or sending alarm messages to the monitoring station.

As described above with respect to FIGS. 1 to 3, the WSN may include any combination of wired and wireless links that are capable of carrying packet and/or switched traffic, may span multiple carriers and a wide geography, and hay have the features discussed above. In an example implementation, portions of WSN may include the Internet. In another implementation, the WSN may include one or more wireless links, and may include a wireless data network, e.g., with tower such as a 2G, 3G, 4G or LTE cellular data network. The panel may be in communication with the network by way of Ethernet switch or router (not illustrated). The panel may include an Ethernet or similar interface, which may be wired or wireless. Further network components, such as access points, routers, switches, DSL modems, and the like possibly interconnecting the panel with the data network are not illustrated.

Figure 4:
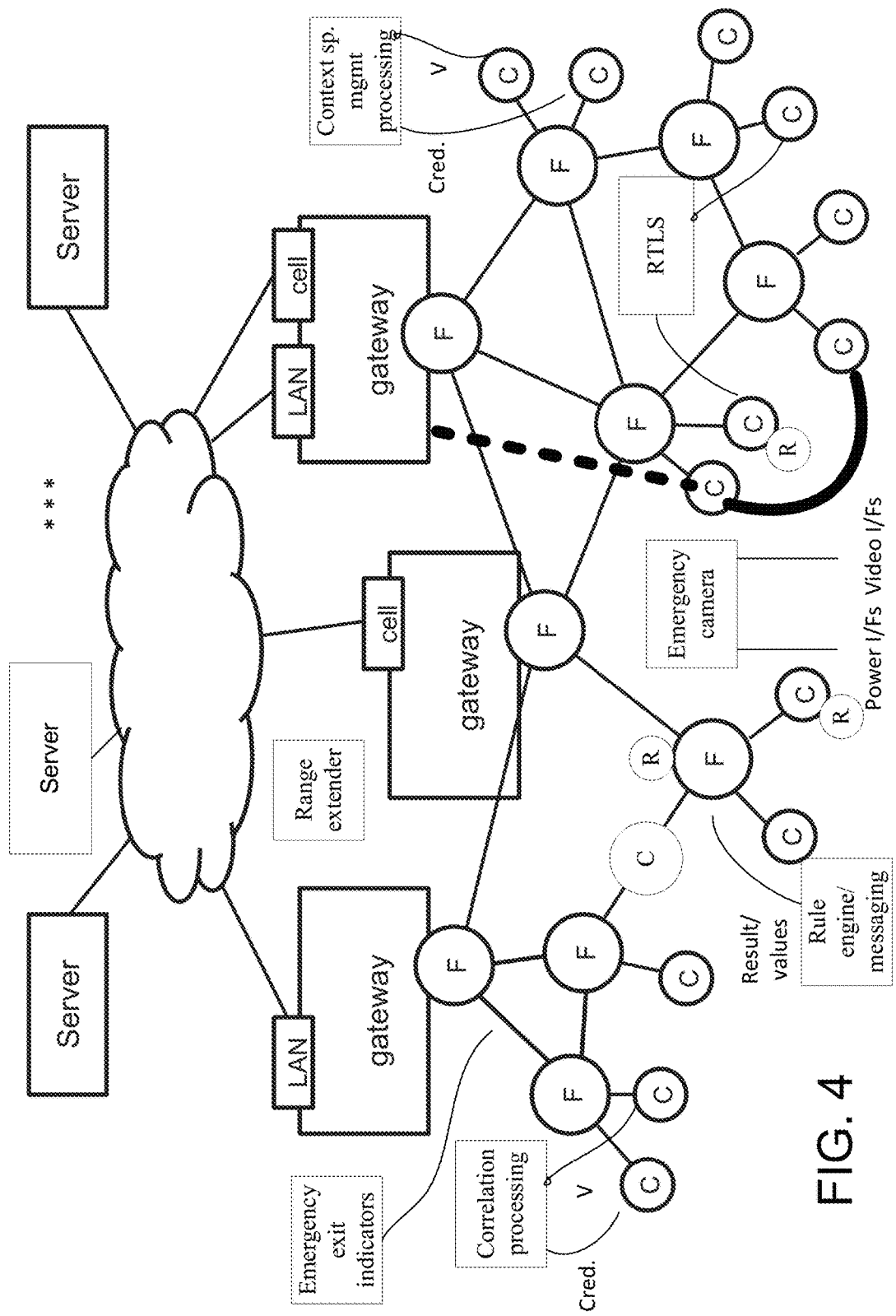
FIG. 4 is a block diagram of components of an example networked security system.

FIG. 4 shows an example of a security system having features of the WSN described with respect to FIGS. 1 to 3 and having the various functionalities described herein. As shown in FIG. 4, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes" can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-atone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be (performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. An apparatus for use in a mesh network, comprising:
memory storing instructions that are executable, and one or more routing tables; and
one or more processing devices to execute the instructions for:
  receiving a routing packet comprising routing information and a route count value;
  storing, in a routing table, an entry comprising the routing information;
  incrementing the route count value to produce an incremented route count;
  transmitting the routing packet over the mesh network, when the incremented route count does not exceed a maximum count corresponding to a maximum number of hops for routing the packet; and
  updating one or more entries in the routing table based on a number of times that the one or more entries were checked following receipt of one or more routing packets, by:
    incrementing a poll count value for an entry of the one or more entries in the routing table;
    comparing the incremented poll count value to a poll count threshold, with the poll count threshold corresponding to a number of times that the entry is checked prior to retransmitting routing information corresponding to the entry; and
    retransmitting the routing information corresponding to the entry when the poll count value indicates retransmission and the route count has a specified value.

2. The apparatus of claim 1, wherein updating the one or more entries comprises:
  incrementing an expire count value for an entry in the routing table;
  comparing the expire count value to an expire count, the expire count corresponding to a number of times that the entry can be checked prior to deletion; and
  deleting the entry from the routing table if the expire count value meets the expire count.

3. The apparatus of claim 1, wherein the poll count has a value indicating that the apparatus is a first transmitter of the routing packet.

4. The apparatus of claim 1, wherein updating comprises deleting one or more entries of the routing table in response to a number of times that the one or more entries have been checked.

5. The apparatus of claim 1, wherein the updating the one or more entries comprises:
  retransmitting routing information for one or more entries of the routing table at least in response to a number of times that the one or more entries have been checked.

6. The apparatus of claim 1, wherein the apparatus comprises a coordinator in a wireless mesh network, and the node comprises an end node of the wireless mesh network.

7. A node network comprising of a plurality of device nodes, the node network comprising:
  a first coordinator to connect to an end node of the plurality of nodes, which receives routing information from the end node, to generate a routing packet comprising the routing information and an initial route count value, and to output the routing packet; and
  a second coordinator to receive the routing packet from the first coordinator over a network connection, and the second coordinator, further configured for:
    storing, in a routing table, an entry comprising the routing information;
    incrementing a route count value to produce an incremented route count;
    transmitting the routing packet over the mesh network if the incremented route count does not exceed a maximum count corresponding to a maximum number of hops for the routing packet; and
    updating one or more entries in the routing table based on a number of times that the one or more entries were checked following receipt of one or more routing packets, by:
      incrementing a poll count value for an entry of the one or more entries in the routing table;
      comparing the incremented poll count value to a poll count threshold, with the poll count threshold corresponding to a number of times that the entry is checked prior to retransmitting routing information corresponding to the entry; and
      retransmitting the routing information corresponding to the entry when the poll count value indicates retransmission and the route count has a specified value.

8. The node network of claim 7, wherein the first coordinator and the second coordinator are configured to communicate via a wireless mesh network.

9. The node network of claim 7, wherein the end node comprises a sensor for a security/intrusion system or an alarm system.

10. A computer program product tangible stored on a computer readable hardware storage device, the computer program product comprising instructions that when executed cause one or more processing devices to:
- receive a routing packet comprising routing information and a route count value;
- store in a routing table, an entry comprising the routing information;
- increment the route count value to produce an incremented route count;
- transmit the routing packet over the mesh network when the incremented route count does not exceed a maximum count corresponding to a maximum number of hops for the routing packet; and
- update one or more entries in the routing table based on a number of times that the one or more entries were checked following receipt of one or more routing packets, by execution of instructions to:
  - increment a poll count value for an entry in the routing table;
  - compare the poll count value to a poll count, the poll count corresponding to a number of times that the entry can be checked prior to transmitting routing information corresponding to the entry; and
  - transmit the routing information corresponding to the entry when the poll count value meets the poll count and the route count has a specified value.

11. The computer program product of claim 10, wherein instructions to update comprises instructions to:
- increment an expire count value for an entry in the routing table;
- compare the expire count value to an expire count, the expire count corresponding to a number of times that the entry can be checked prior to deletion; and
- delete the entry from the routing table if the expire count value meets the expire count.

12. The computer program product of claim 10, wherein the poll count has a value indicating that the apparatus is a first transmitter of the routing packet.

13. The computer program product of claim 10, wherein updating comprises deleting one or more entries of the routing table in response to a number of times that the one or more entries have been checked.

14. The computer program product of claim 10, wherein the updating the one or more entries comprises:
- retransmitting routing information for one or more entries of the routing table at least in response to a number of times that the one or more entries have been checked.

* * * * *